Figure 1:
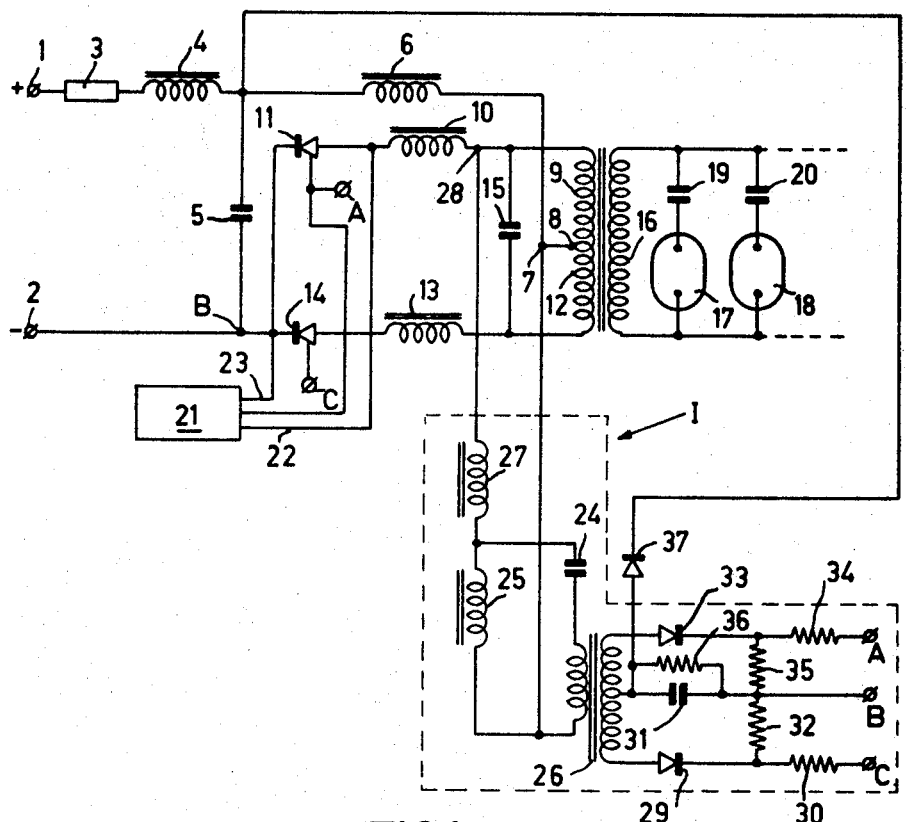

United States Patent Office 3,412,309
Patented Nov. 19, 1968

3,412,309
ARRANGEMENT INCLUDING A DC-AC CONVERTER WITH AT LEAST ONE CONTROLLED RECTIFIER
Lieuwe Boonstra, Emmasingel, Eindhoven, Netherlands, assignor to North American Philips Co., Inc., New York, N.Y., a corporation of Delaware
Filed Dec. 28, 1966, Ser. No. 605,367
Claims priority, application Netherlands, Jan. 25, 1966, 6600907
4 Claims. (Cl. 321—12)

This invention relates to arrangements including a DC-AC converter with at least one controlled rectifier, for example, a thyratron or a semiconductor rectifier for converting the voltage of a direct-current source into an alternating voltage and including a generator for producing pulses to make the controlled rectifier conducting. It is common practice to shunt the input terminals of such a converter by a capacitor of, for example, 100 μfs. in order to keep the alternating voltage produced away from the direct voltage source. In arrangements including more than one converter it has furthermore been found advantageous to connect each converter via an input filter including the series-combination of an inductor and the said capacitor, the ends of the series-combination being connected to the leads of the direct current source.

The converters and more particularly their controlled rectifiers are usually protected from interference, such as excessive load, short circuit in the load circuit, untimely extinction or ignition of a controlled rectifier, by means of a fuse. However, during operation, the interference is found to be for the greater part of a temporary nature. In railway lighting systems equipped with converters, more than 90% of the interference is attributable to, for example, poor contacts of the plugs or fittings, momentary short circuits in coupling plugs or fittings, to parasitic pulses produced, for example, upon switching-over from battery supply to DC by a supply generator or conversely. A result of said kinds of interference is a considerable wastage of fuses.

An object of the invention is to provide an arrangement of the kind mentioned in the preamble in which the converter itself is safeguarded against interference of temporary nature, so that such interference cannot cause breakdown of a fuse. It is based upon the idea to use the input filter, which is usually present already, also as a protective extinguishing circuit while taking steps to ensure that the circuit of the generator can no longer give pulses to the controlled rectifier after extinction.

The arrangement according to the invention therefore includes an input filter with a series-combination of an inductor and a capacitor, the ends of the series-combination being connected to the direct current source, and the converter shunting the capacitor. It is characterized in that the inductor has a value such that, as a result of an interference in the converter or in its supply or load circuit which keeps the controlled rectifier conducting, an oscillation is produced such that the voltage across the capacitor passes through zero so that the controlled rectifier extinguishes despite the interference, a voltage being derived from the said oscillator and preventing the pulses of the generator circuit from reaching the rectifier.

If an interference occurs (for example a momentarily interrupted load, a wrong load, a poor contact in the converter or a rapid variation in the mains voltage) it is found possible for the controlled rectifier to remain conducting.

If the inductor of the input filter is given a high value, for example, more than a fivefold of the inductive input reactance of the converter, the capacitor of the input filter has a tendency to discharge in an oscillatory manner through the converter. When the voltage of the capacitor has passed the zero value and hence become negative, the current in the converter and hence the current flowing through the controlled rectifier, will become zero, for the maximum negative value of the voltage on the capacitor, so that said rectifier can switch off. The input filter thus has fulfilled its protective function. If the inductor of the input filter is given a value which is less than approximately a fivefold of the inductive input reactance of the converter, it is found that the current flowing through the converter, in case of the controlled rectifier remaining conducting, is determined unduly by the mains voltage and the current flowing through the controlled rectifier cannot then be reduced to zero without further expedients such as, for example, a fuse.

If, for example, one has managed to extinguish the controlled rectifier of the converter by means of the input filter, the situation is such that the circuit of the generator could still give pulses to the controlled rectifier due to decay, so that the rectifier could yet become conducting again. To prevent this, upon extinguishing by means of the input filter, an oscillation which occurs during the interference is used to derive therefrom a voltage which forms a kind of a barrier to the pulses from the generator to the controlled rectifier. It is possible to use, for example, an oscillation which occurs during an interference in the inductor of the input filter.

Use is preferably made of an arrangement in which a transformer is included in the lead connecting the input filter and the converter, the voltage produced in the transformer by the oscillation being applied via a Zener diode to a connection point between the generator and the controlled rectifier. This affords the advantage that direct use is made of the current in the input circuit of the converter so that a strong increase in this current, such as may occur in the case of an interference, gives rise to the desired pulse barrier.

In one particular embodiment of the arrangement the capacitor of the input filter is shunted by the series-combination of a diode and a second capacitor, the second capacitor being included in the circuit of the generator and shunted by a resistor. This arrangement affords the advantage that the number of elements required for obtaining a pulse barrier is limited to three, that is to say a diode, a capacitor and a resistor.

The so-called second capacitor could be present in, for example, the input circuit of the generator. In one particular embodiment of the arrangement the second capacitor is included in the output circuit of the generator, namely in a connection between the control electrode and the cathode of the controlled rectifier.

Figure 2:
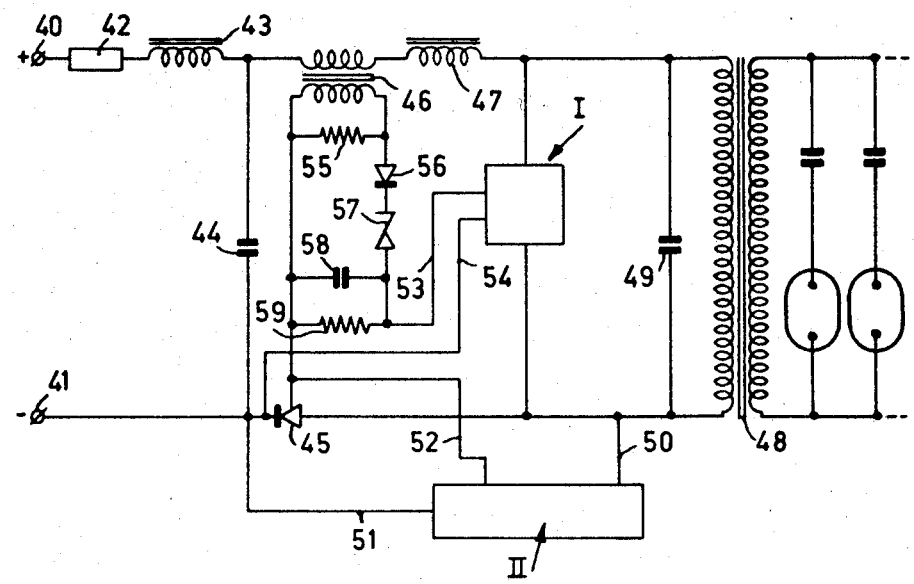

In order that the invention may be readily carried into effect, it will now be described, in detail, by way of example, with reference to the accompanying diagrammatic drawings, in which, FIGURE 1 shows a converter with an input filter and a generator circuit which includes a so-called second capacitor to obtain a pulse barrier;

FIGURE 2 shows a converter with an input filter and a generator (shown diagrammatically) in which the pulse barrier is derived from a transformer included in a lead connecting the input filter and the converter.

In FIGURE 1, connecting terminals 1 and 2 of the arrangement are intended to be connected to the positive and negative terminals, respectively, of a direct current source. Between the terminals 1 and 2, there is included the series-combination of a fuse 3 and an input filter comprising an inductor 4 and a capacitor 5. The capacitor 5 is shunted by a converter comprising inter alia an inductor 6, a tapping point 7, a tapping point 8, and then two series-combinations comprising respectively a transformer winding 9, an auxiliary coil 10, a thyristor 11 and a tapping point B at the other side of capacitor 5, and a transformer winding 12, an auxiliary coil 13, a thyristor 14 and a tapping point B. The windings 9 and 12 of the transformer are shunted together by a capacitor 15. A secondary winding of the transformer, indicated by 16, is loaded with gas-discharge lamps 17, 18 etc. which are stabilised by means of capacitor 19, 20 etc.

In addition to the main circuit above described, there are two auxiliary devices, that is to say a starting device 21, which is not shown in detail, and a generator device (see the diagram I shown in broken lines). The auxiliary devices serve to obtain the correct pulses at the control electrodes of the thyristors 11 and 14.

A starting pulse is necessary to put the converter into operation, which pulse makes one of the thyristors conducting. The starting pulse is provided by the device 21, which is fed from the mains via connections 22 and 23 and which is connected to the control electrode of thyristor 11. When thyristor 11 becomes conducting, the capacitor 15 of the converter is charged and hence the circuit I of the generator switched on.

The generator device I comprises an oscillatory circuit having a capacitor 24 and an inductor 25 and also a pulse transformer 26. Said oscillatory circuit is coupled to the oscillatory circuit of the converter through an inductor 27. When the main capacitor 15 is charged after a starting pulse from the device 21, a voltage results between the points 7 and 28 of the converter to which the circuit of the generator is connected, resulting in the circuit 24, 25 being excited. The current in this circuit passes through the pulse transformer 26 which includes a ferrite core having a rectangular hysteresis loop. Each time the current in the circuit passes through zero, said core is switched from the magnetic condition to the opposite value, resulting in a voltage pulse of short duration in the secondary side of transformer 26 and hence in the output circuit of generator I. The voltage on the secondary side of transformer 26 is applied in part through a diode 29 and a resistor 30 and point of connection C to the control electrode of thyristor 14. Point of connection B is connected to the cathode side of thyristor 14 and also via a capacitor 31, which will be referred to hereinafter, to a centre tap on transformer 26. Resistor 32 is a safety resistor. The first voltage pulse produced by the generator I is fed to thyristor 14. The thyristor 11 has in the meantime been extinguished due to the current in the converter becoming zero and the starting circuit was switched off by reversal of the potential across 22 and 23. So thyristor 14 is now conducting and the circuit 24, 25 is excited again. Thyristor 14 extinguishes again due to the current in the converter becoming zero. Now, the thyristor 11 receives a pulse via a similar circuit to that formed by B, 31, a portion of transformer 26, 29, 30, C. Said circuit includes a diode 33, a resistor 34 and two points of connection A and B. Resistor 35 is a safety resistor.

The fact that the thyristors 11 and 14 alternately become conducting provides an alternating current in the primary winding (9, 12) of the transformer of the converter. These alternations are transferred to the secondary winding 16 of said transformer and further to the lead.

As previously mentioned, the described circuit of the generator I includes a capacitor 31 which is shunted by a resistor 36. The series-combination of (B), capacitor 31 and a diode 37 shunts the capacitor 5 of the input filter.

During the normal operation of the converter capacitor 31 has no particular function. It is charged but discharged again rapidly enough via resistor 36 in order that the transfer of the pulses described is not hindered. During normal operation the diode 37 does not convey current.

In a concrete case the direct voltage between the terminals 1 and 2 was 118 volts. The frequency of the converter was 6800 c./s. and the voltage across the secondary winding 16 of the transformer was 270 volts. The inductor 4 was 1.5 mh. and the inductive input reactance of the converter which comprises the sum of the inductances of inductor 6 (10 $\mu$h.), one of the primary windings of the transformer, for example 9 (125 $\mu$h.), and one of the auxiliary coils, for example 10 (10 $\mu$h.), thus was in total 145 $\mu$h. That is to say the inductor 4 had a value which was approximately the tenfold of that of the inductive input reactance of the converter. Capacitor 5 was 100 $\mu$f., the capacitor 15 was 0.67 $\mu$fs. and the capacitor 31 was 4 $\mu$fs. The resistor 36 was 390 ohms. The load was formed by 20 low-pressure mercury-vapour discharge lamps each of 40 watts having an operating voltage of 95 volts. Each of the stabilising capacitors 19 and 20 had a capacity of 0.039 $\mu$fs.

If an interference occurs in the main circuit whereby, for example, the load circuit 19–17, 20–18 is momentarily interrupted, it is possible that, for example, thyristor 11 no longer reaches the cut-off condition since the available period of recovery has become too short. Due to the high ratio between the impedance of the inductor 4 of the input filter and the inductive input reactance of the converter, capacitor 5 of the input filter will commence to discharge through inductor 6, primary winding 9, auxiliary coil 10, thyristor 11 and point B. When the voltage of capacitor 5 has become negative, the diode 37 becomes active and charges (via the series-combination: diode 37, capacitor 31, point B) the capacitor 31 in the circuit of the generator thus making the B-side of capacitor 31 strongly positive. This constitutes a barrier for any pulses appearing on the thyristors (11 and 14). A few instants thereafter, the voltage on capacitor 5 will have acquired its maximum negative value and the current flowing through thyristor 11 will thus become zero so that this thyristor extinguishes. Due to the presence of the pulse barrier there is no longer a risk of the thyristors being made conducting again.

When, after lapse of a certain period, capacitor 31 has discharged via resistor 36, the voltage between the points 7 and 28 of the converter (to which the generator I is connected) has dropped to zero long since, so that no new pulses can be expected from the circuit of the generator.

The starting circuit 21 which operates at a much lower frequency (approximately 10 c./s.) will make thyristor 11 conducting again after a certain period. If the interference then still exists, the described process of switching off is repeated. If, however, the interference has disappeared in the meantime, the converter is normally put into operation again.

In FIGURE 2 the reference numerals 40 and 41 indicate the connecting terminals for connection to the positive and the negative side, respectively of a direct current mains. FIGURE 2 has a certain similarity with FIGURE 1. Thus 42 indicates a fuse and the series-combination of an inductor 43 and a capacitor 44 constitutes the input filter. FIGURE 2 also shows, this in contrast with FIGURE 1, a converter having one thyristor 45 only. The thyristor 45 is included in a series-combination comprising the primary winding of a transformer 46, an inductor 47, and a primary winding of a transformer 48. This series-combination shunts capacitor 44.

The primary winding of transformer 48 is shunted by a capacitor 49. The generator device (not now detailed) for producing the pulses is again indicated by I. The starting device, indicated by II, operates approximately in the same manner as in FIGURE 1. It is fed from the mains through connections 50 and 51 and is connected to the control electrode of thyristor 45 through a lead 52. Generator I is connected to the control electrode of thyristor 45 through a lead 53 and to the cathode of thyristor 45 through a lead 54.

The loads on the converter shows similarity with the load described with reference to FIGURE 1.

The secondary winding of transformer 46 is shunted by a safety resistor 55 and also by the series-combination of a diode 56, a Zener diode 57 and a capacitor 58. The latter is shunted by a discharging resistor 59.

The normal operation of the converter of FIGURE 2 and of the auxiliary devices, that is to say the starting circuit II and generator I, roughly corresponds to that described with reference to FIGURE 1, except that FIGURE 1 includes a push-pull converter and the converter of FIGURE 2 includes one thyristor only. The normal operation of the converter of FIGURE 2 will therefore not be described further.

In a concrete case the direct voltage between 40 and 41 again was 118 volts. The frequency of the converter was 6800 c./s. The inductance of 43 was 1.5 mh. and the sum of the inductances of the primary windings of 46, 47 and 48 was 146 μh.

The peak value of the current flowing through the primary winding of transformer 46 normally was 40 amps. When this current exceeded 60 amps the Zener voltage of Zener diode 57 was reached.

In case of an interference, the thyristor 45 will again be unable to reach the cut-off condition for the same reason as described with reference to FIGURE 1. The peak value of the current flowing through the series-combination 46, 47, 48, 45 thus exceeds 60 amps considerably. The voltage thus induced in the secondary winding of transformer 46 then becomes so high that the Zener voltage of Zener diode 57 is reached and a strong current charged capacitor 58, namely with the positive side adjacent the generator I. This again results in a pulse barrier in the connection between generator I and the control electrode of thyristor 45 through the lead 53.

By the specified correct choice of the value for inductor 43, the thyristor will extinguish in this case also through the reversal of the voltage across capacitor 44.

It should again be noted that the current flowing through transformer 47 during normal operation is not so high that the Zener voltage of the Zener diode 57 is reached so that no pulse barrier then occurs.

What is claimed is:

1. An arrangement including a DC-AC converter with at least one controlled rectifier for converting the voltage of a direct-current source into an alternating voltage and including a generator for producing pulses to make the controlled rectifier conducting and including an input filter with a series-combination of an inductor and a capacitor, the ends of this series combination being connected to the direct current source, and the converter being connected in shunt with the capacitor, the said inductor having a value such that, as a result of an interference which keeps the controlled rectifier conducting, an oscillation is produced such that the voltage across the capacitor passes through zero, thereby extinguishing the controlled rectifier despite the interference, a voltage being derived from the said oscillator and preventing the pulses of the generator circuit from reaching the rectifier.

2. An arrangement as claimed in claim 1, wherein the lead connecting the input filter and the converter includes a transformer, the voltage produced in the transformer by the oscillation being applied through a Zener diode between the generator and the controlled rectifier.

3. An arrangement as claimed in claim 1, wherein the capacitor of the input filter is shunted by the series-combination of a diode and a second capacitor, the second capacitor being included in the circuit of the generator and shunted by a resistor.

4. An arrangement as claimed in claim 3 wherein the second capacitor is present in the output circuit of the generator, said capacitor being connected between the control electrode and the cathode of the controlled rectifier.

References Cited

UNITED STATES PATENTS

| | | | |
|---|---|---|---|
| 3,315,146 | 4/1967 | Paice | 321—45 |
| 3,325,716 | 6/1967 | Gomi | 321—45 XR |

LEE T. HIX, *Primary Examiner.*

W. M. SHOOP, *Assistant Examiner.*